(No Model.)
J. L. COLLINS.
EDUCATIONAL APPLIANCE.
No. 501,675. Patented July 18, 1893.
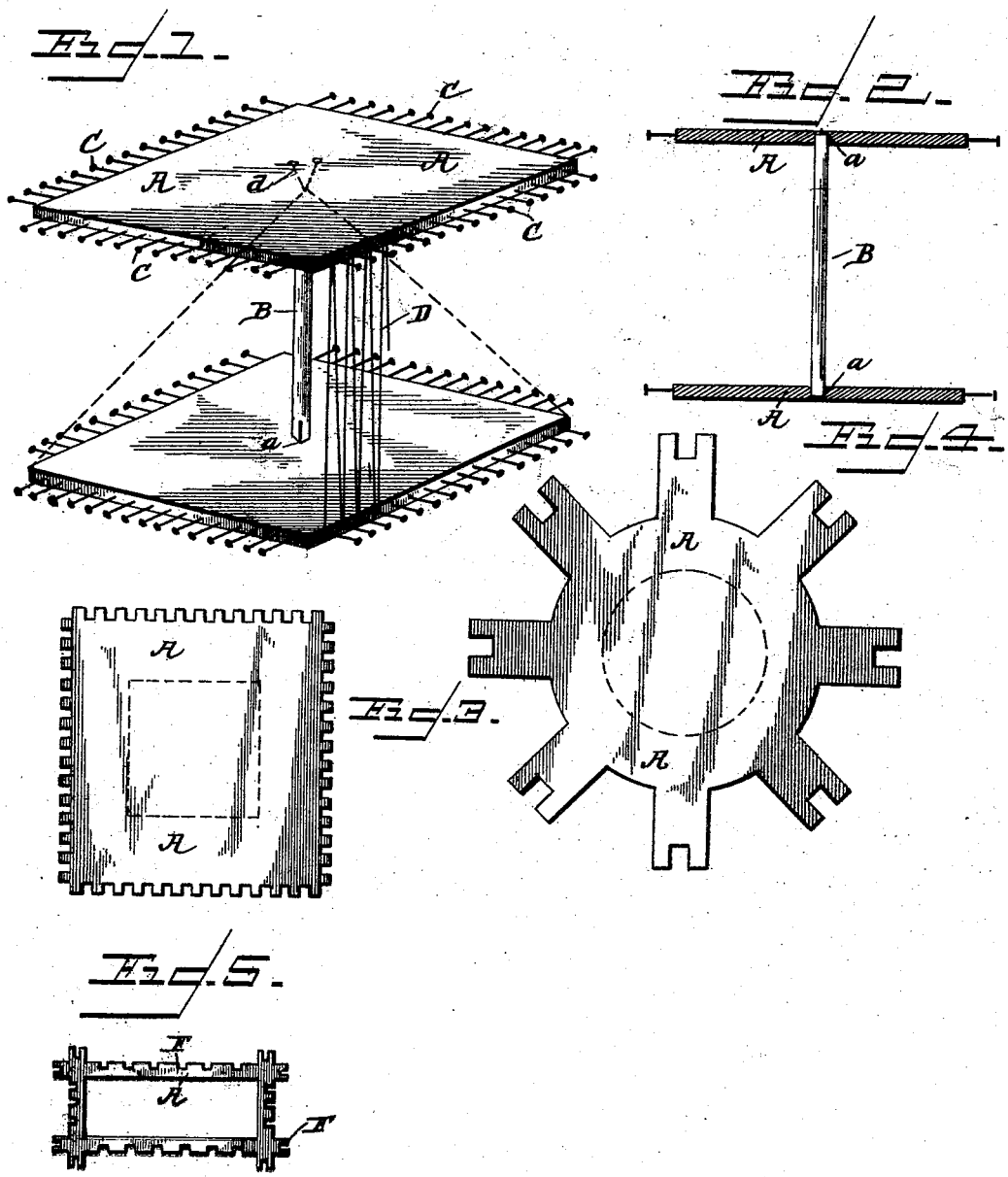
Witnesses
E. N. Stewart
Inventor
Judith L. Collins.
By her Attorneys,

UNITED STATES PATENT OFFICE.

JUDITH LENORE COLLINS, OF MONONGAHELA CITY, PENNSYLVANIA.

EDUCATIONAL APPLIANCE.

SPECIFICATION forming part of Letters Patent No. 501,675, dated July 18, 1893.

Application filed June 17, 1892. Serial No. 437,110. (No model.)

*To all whom it may concern:*

Be it known that I, JUDITH LENORE COLLINS, a citizen of the United States, residing at Monongahela City, in the county of Washington and State of Pennsylvania, have invented certain new and useful Educational Appliances; and I do hereby declare that the following is a full, clear, and exact description of the invention, which will enable others skilled in the art to which it appertains to make and use the same, reference being had to the accompanying drawings, which form a part of this specification.

The objects of my invention are to provide simple and readily-understood means for teaching the elements of designing, and also the contrasting and combining of colors, &c., and with these objects in view the invention consists, essentially, in providing plates, boards, or cards of various sizes and shapes and means for combining them in various ways to form the outlines of various geometrical figures, and furthermore, in providing said plates, cards, and boards with projecting pins or points, to enable the scholar to cover or decorate the frames or forms by the arrangement, in artistic or fantastic figures, of a cord or cords, of various colors, upon said pins or points.

Further objects and advantages of my invention will appear in the following description and the novel features thereof will be particularly pointed out in the appended claims.

In the drawings, Figure 1 is a perspective view of a frame designed as a form for cubes, &c., and showing the manner of attaching the cord thereto to complete the cube. Fig. 2 is a vertical sectional view of the same. Fig. 3 is a plan view of one of the plates, cards or boards, showing a slightly different construction of means for attaching the cord or cords, said plate, card or board being designed for use independently in the formation of mats, &c. Fig. 4 is a view of a plate, card or board designed for use in forming circular or polygonal figures. Fig. 5 is a view of a plate, card or board adapted to be used in forming picture frames, &c.

Referring to Fig. 1, A A represent parallel plates, cards or boards, connected at their centers by the axially-disposed stem B, which is provided with squared ends to fit in corresponding sockets, $a\ a$, in the inner or opposing surfaces of the plates. As shown in Fig. 1 these plates, cards, or boards (which may be made of sheet metal, card-board, or wood) are of the same size and are square, thereby forming the skeleton of a cube, and the pins or points C C, which are arranged in the peripheries of the plates, cards or boards are designed for the attachment and arrangement of a cord or cords D. By having one of the plates smaller than the other the shape of the design may be varied to form a truncated pyramid, and by using circular instead of square plates either a cylinder or a frustum of a cone may be produced. Also, by using one of said square or circular plates as a base and the stem as an axis a pyramid or a cone may be formed by draping or attaching the cord to the pins or points upon the base and to a pin or pins $d$, indicated in dotted lines in Fig. 1. One of these plates, cards or boards, may be used independently, as indicated in Fig. 3, in said figure the attaching points being formed by notching the edges. This form is designed for forming mats by carrying the cord or cords diagonally or diametrically across the surface of the plate, and I sometimes cut away the center of the latter, as shown in dotted lines, to allow the cords upon the reverse side to be seen.

Fig. 4 shows another form of plate, card, or board which may be used to form mats or figures of a circular or polygonal outline, this also, when desired, being cut away at its center, as indicated in dotted lines.

Fig. 5 shows a plate, card or board, having an open center, and projecting, notched arms, F, this being peculiarly adapted for forming picture frames, the edges of the frame being notched to receive the cord or cords.

It will be understood that different colored yarns or cords may be used independently or simultaneously upon either of the plates, cards, or boards, which I have illustrated and described.

Furthermore, it will be evident that I have shown and described only a few of the many forms and combinations of plates which may be employed in this connection, but sufficient to show the principle and the manner of carrying it out in accordance with the invention.

The surfaces of the plates, cards, or boards may be colored or marked with panels or designs for guides to the pupil, or sheets of colored paper containing such designs or coloring as will serve as guides or will serve to throw into relief the cords which are arranged thereon, may be used. Also, after a design has been formed as upon one side of the frame shown in Fig. 1 or upon the surface of one of the plates a paper may be spread thereover to conceal it, and held in place by means of the pins and another design formed on top of the paper, and so on, whereby a series of designs may be formed and preserved.

I claim—

1. In an educational appliance, a plate, card, or board provided with peripheral pins or points lying in the plane thereof, and a cord or cords to engage such pins or points to form designs, substantially as specified.

2. An educational appliance having duplicate plates, cards or boards, arranged in different planes and provided with central sockets and pins or points, a stem fixed at its ends in said sockets, and cords to engage said pins or points, substantially as specified.

3. In an educational appliance, the plate, card or board provided with attaching pins or points, the cords to engage said pins or points, and removable design-sheets to cover the plate, card, or board, substantially as specified.

JUDITH LENORE COLLINS.

Witnesses:
R. B. PATTERSON,
W. R. SUITER.